United States Patent [19]
Laughlin

[11] Patent Number: 5,740,994
[45] Date of Patent: Apr. 21, 1998

[54] CABLE SUPPORT AND METHOD

[75] Inventor: Raymond Scott Laughlin, Cuyahoga Falls, Ohio

[73] Assignee: Erico International Corporation, Solon, Ohio

[21] Appl. No.: 773,981

[22] Filed: Dec. 26, 1996

[51] Int. Cl.6 ............................................. F16L 3/22
[52] U.S. Cl. ................................. 248/68.1; 248/58
[58] Field of Search .................. 248/74.1, 73, 68.1, 248/58, 59, 62, 65, 903

[56] References Cited

U.S. PATENT DOCUMENTS

| | | | |
|---|---|---|---|
| 622,778 | 4/1899 | Nordyke | 248/68.1 X |
| 887,272 | 5/1908 | Robinson | 248/68.1 |
| 2,285,632 | 6/1942 | Urbain | 248/68.1 X |
| 4,039,131 | 8/1977 | Perrault et al. | 248/903 X |
| 4,709,888 | 12/1987 | Cubit et al. | 248/73 |
| 5,135,187 | 8/1992 | Joas et al. | 248/49 |
| 5,427,338 | 6/1995 | Garret et al. | 248/68.1 |
| 5,542,631 | 8/1996 | Bruno | 248/58 |

FOREIGN PATENT DOCUMENTS

1042814  9/1966  United Kingdom ............. 248/73

*Primary Examiner*—Ramon O. Ramirez
*Attorney, Agent, or Firm*—Renner, Otto, Boisselle, Sklar

[57] ABSTRACT

A cable support for category 5 cable, fiber optic cable, and the like is in the form of a curved smooth saddle to support the cable in lay-in fashion. The saddle has a projecting stem with a number of fastening accommodations to receive all kinds of clamps, clips or brackets, so that one or more supports may be positioned on or suspended from anything or any surface in the utilitarian part of a building such as the area above a drop ceiling. This enables the supports to be positioned within about 120–150 cm of each other so that cable sag between support saddles does not exceed 30 cm.

45 Claims, 3 Drawing Sheets

CABLE SUPPORT AND METHOD

DISCLOSURE

This invention relates generally as indicated to a cable support and method and more particularly to a cable supporting system for category 5 cable and high performance communications cable, including fiber optic cable.

BACKGROUND OF THE INVENTION

UTP category 5 cable is a data or communications cable constructed of 4 unshielded twisted pairs of 24 AWG thermoplastic insulated conductors enclosed is a thermoplastic jacket. The pairs of copper wires are tightly twisted to achieve high speed transmission; the tighter the twist, the faster the possible transmission speed. While UTP is available in Category 3, 4 or 5, the higher the number, the tighter the twist. The tighter twist also helps reject electromagnetic interference. While many designers have selected category 3 for voice and category 5 for data, the trend is to install category 5 for all applications in commercial buildings.

As the computer and communications industries have grown, the organization and management of the cabling has become a serious problem. It has literally been dumped on the floor or dropped through walls, kinked around corners, or simply dropped on or dragged over the top of suspended ceilings. Cables such as UTP cables and fiber optic cables simply cannot be treated in such a cavalier fashion and have the equipment they serve meet expectations.

For example cross-talk on a telephone may be due to improper cabling or cable placement. Attenuation, crosstalk, data distortion, and return loss all affect signal strength which can degrade any system transmission capability. Attenuation is the loss of power or signal strength along the transmission medium. Cross-talk is an unwanted transmission from another nearby cable, or even a pair in the same cable. Return loss is a measure of degree of impedance between the cable and a connector. Background noise is also an irritating problem resulting from a low signal-to-noise ratio. Inadequate cable installation is a key reason for such factors, especially when data and voice transmission speeds are continually being increased, for example from 16 MHz to 100 MHz or more.

Such cable should not be kinked, snaked, bent sharply, tugged, sag excessively, or come into engagement with sharp edges, or be too close to power cables.

The wiring can be placed under the floor with elevated flooring which is extremely expensive and often not practical. A more common place for such wiring is above the ceiling between the structural floor or roof above, and a dropped or acoustical ceiling.

If the building is being built new and is being designed with such cable in mind, cable trays are often employed. These are simply suspended or cantilevered trays in which such cable can be laid flat to extend horizontally, and are hung or suspended from beams, joists, or decking for example, oftentimes by trapeze hangers. Such trays can be retrofitted into existing buildings, but not easily or economically, particularly if there is not a significant amount or extent of open or unobstructed horizontal space.

The area above many acoustical or drop ceilings is usually cluttered with structural members such as beams or open joists, utilities such as plumbing or sprinkler systems, HVAC ducts, conventional power wiring, often encased in conduit or armored, and of course the suspension hangers for the ceiling and any lighting or other fixtures in the ceiling. Moreover, most beams, joists and other structures extend in a rectilinear fashion above a ceiling, while communications or data cabling usually radiates from a panel or closet in a star topology.

Conventional power wiring clips, snaps, wire hooks, bridle rings, or plastic ties are not suitable for such cable because of a variety of factors. They may present sharp edges or produce sharp turns or kinks in the cabling, or they may crush or pinch a bundle.

Accordingly, there is a need for a category 5 or fiber optic cable support for the careful lay-in installation of such voice or data transmission cabling in the utilitarian areas of a building, such as the area above the suspended ceiling and the gridwork thereof, and which can be fastened to or supported directly or indirectly from anything encountered.

SUMMARY OF THE INVENTION

A support has a cable supporting saddle which enables such category 5 cable to be simply laid in. The saddle includes a smooth center circular surface having edge flanges which extend away from the center at each edge at about 45° and a radius is provided at each edge where a 45° corner would exist otherwise. A center outwardly extending shallow U-shape reinforcing groove is provided in the center of the saddle for the extent of the curvature of the saddle. The interior of the saddle may extend for about or slightly more than 180° and provides very slight shoulders at each side so that a plemun guard for a fiber optic cable or innerduct will nest snugly in the saddle. The support is in the form of a J-hook and the interior surface of the crook of the J forms the saddle and provides an extra wide cable support base on a flat stable surface with no sharp edges, eliminating kinking, bending or crimping. Various diameters of saddles may be provided accommodating, for example, a bundle of 80 or more cables of four twisted pairs, as well as the plemun guard or innerduct for the noted snug fit.

The saddle of the J may be closed by a tie, and corresponding holes in the tip of the saddle and the stem of the J are provided for the tie. The tie may close the top of the saddle after the cables are in place. It may also extend around the exterior or bottom of the saddle completely encircling the cable bundle, but without contact with the cables.

As important, the extended stem of the J is provided with three different holes and a pair of anti-twist dimples. One hole is a thread impression for quick field assembly with a variety of other fasteners or brackets. Another hole is designed to receive a nail or screw for attachment to a surface or stud, while a third hole is designed for a rivet providing a factory formed permanent connection to a variety of other fasteners. The J-hook can be quickly fastened to a wide variety of structures, walls or studs, beam or angle flanges, C-purlins or Z-purlins, with screw-on or hammer-on fasteners, or even drop wires, rods or vertical flanges with other types of fasteners.

With a special angle bracket a number of such J-hooks can be assembled to each side of the bracket and the bracket in-turn secured to a beam flange or joist, for example with another fastener. The bracket can also be used inverted with yet another fastener to elevate the support above a structure such as a Tee bar of a suspended ceiling grid.

With the ability to secure the J-hook support to anything, the saddles of the supports can be arranged and spaced to avoid placing pressure or stress on the cable, or pinching or kinking the cable. The spacing is such that excessive sag between supports is avoided. With the flexibility of the system, the J-support hooks can be placed within about 120 to 150 cm of each other to avoid an intersaddle sag of more than about 30 cm. The support system thus provides a process of support for such category 5 cable and the like which maintains the sag between supports to be less than about 1 foot.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
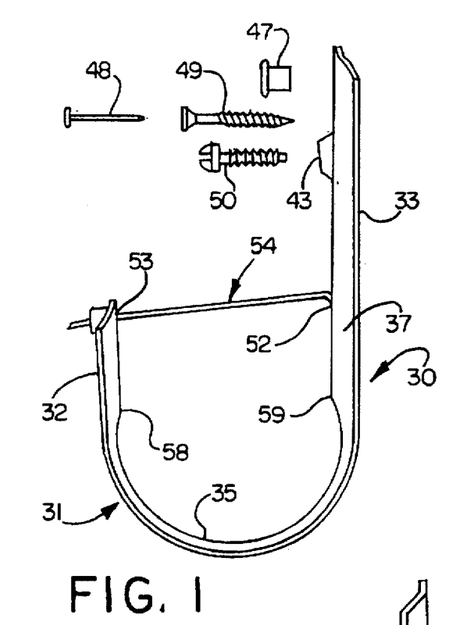
FIG. 1 is a side elevation of a lay-in cable support in accordance with the present invention also illustrating various fasteners usable with the support, and a plastic tie across the saddle.
Figure 2:
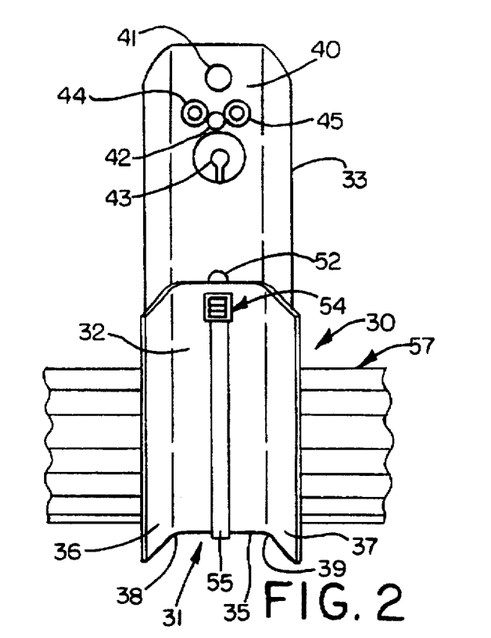
FIG. 2 is a front elevation as seen from the left hand side of FIG. 1 illustrating the various mounting holes for the fasteners, and a cable bundle in place.

Referring initially to FIGS. 1 and 2 there is illustrated a cable support shown generally at 30 in accordance with the present invention which includes a semi-circular saddle shown generally at 31 which extends for approximately 180°. The semi-circular saddle includes a tip shown at 32 on one side and a somewhat longer stem 33 on the opposite side. The tip extends almost parallel to the stem but flares slightly away from the stem. The configuration of the semi-circular saddle, the tip and the stem give the cable support the general configuration of a J-hook.

The support saddle includes a semi-circular center section 35 and two downwardly and outwardly extending angle flanges 36 and 37 which would normally intersect the center cylindrical section 35 at 45°. A radius, however, is provided at the corners indicated at 38 and 39 so that the interior of the saddle has no sharp edges or even sharp obtuse corners. The flanges extend throughout the length of the support including both the tip 32 and the stem 33.

In comparing FIGS. 1 and 2 it will be seen that the upper portion of the stem indicated at 40 has a height about twice the diameter of the saddle and is provided with several holes of varying sizes and configurations. Reading from the top, the stem is provided with a rivet hole 41, a nail or screw hole 42, and a thread form hole 43. Positioned on each side of the hole 42 and symmetrically with the hole 41 are two anti-twist dimples seen at 44 and 45.

Referring again to FIG. 1 it will be seen that the hole 41 is designed to accommodate a rivet 47. The smaller hole 42 may accommodate either a nail 48 or screw 49, while the thread form hole 43 accommodates the screw or bolt 50 which may have threads generally matching the thread form. The fastener 50 may be a standard ¼ inch bolt.

In addition, the base of the stem is provided with a hole 52 while the tip is provided with a hole 53. These holes are generally opposite each other, and such holes may accommodate a plastic tie indicated at 54. The tie extends over the top of the saddle and may also extend around the bottom of the saddle as indicated at 55 in FIG. 2. The tie 54 may then extend over the top of the bundle 57 seen in FIG. 2 which has been laid-in the saddle. Alternatively, the tie may extend complete around the bundle beneath the bottom of the saddle. In either event, the optional tie closing the saddle does not touch the bundle, after the bundle is simply laid-in the supporting saddle.

As indicated in FIG. 1, the circular extent of the saddle 35 terminates at slight shoulders 58 and 59 which are illustrated somewhat exaggerated in FIG. 1 giving the saddle a circular extent at least equal to 180° and perhaps slightly more. The shoulders are designed to accommodate in a snug fit the plemun guard for fiber optic cable or an innerduct. The snug fit simply means that the plemun chamber or innerduct of such cable is not loose, but conversely neither crushed nor pinched.

Figures 3, 4, 5:
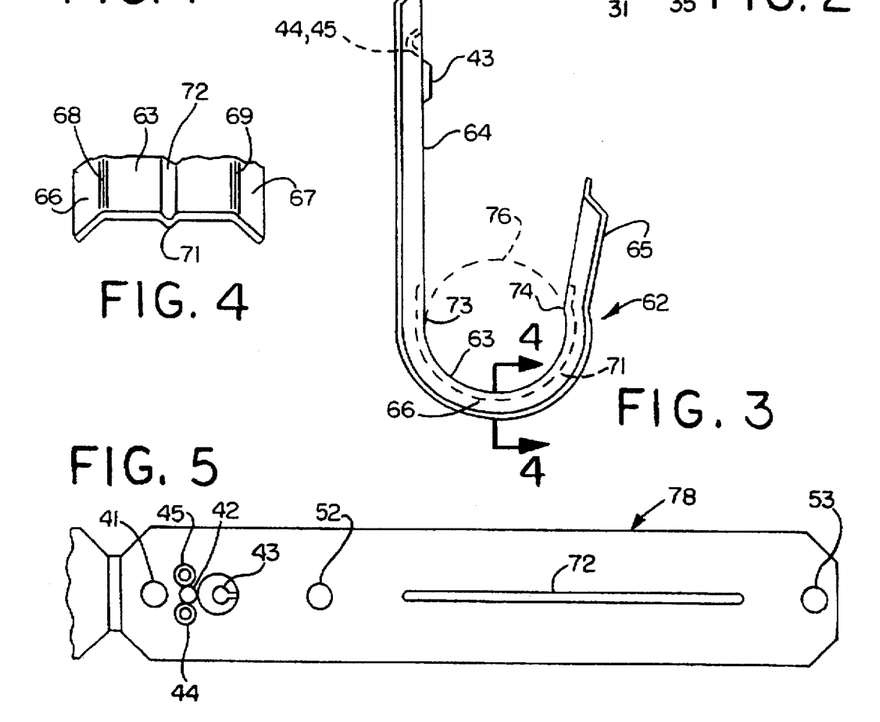
FIG. 3 is an opposite side elevation of a somewhat smaller embodiment illustrating in phantom lines a plemun guard for fiber optic cable or innerduct nested in the saddle.
FIG. 4 is an enlarged transverse section through the bottom of the saddle taken from the line 4—4 of FIG. 3.
FIG. 5 is a plan view of the blank from which the support is formed.

FIGS. 3 and 4 illustrate a slightly different size saddle support for such cable indicated generally at 62. The saddle includes a circular interior surface 63, the stem 64, and the tip 65. Extending throughout the support are lateral outwardly and downwardly turned flanges 66 and 67 which extend at approximately 45° with respect to the center smooth surface 63. Radii are provided at 68 and 69 to provide rounded or smooth corners at which otherwise would be an obtuse angle of 135°.

As illustrated more clearly in FIGS. 4 and 5, the curved saddle portion is provided with a rounded relatively shallow center reinforcing ridge seen at 71. The ridge forms a center interior groove 72 extending around the circular surface of the saddle 63 and slightly beyond the exaggerated shoulders 73 and 74 adapted to receive in a snug fit the innerduct or plemun chamber for fiber optic cable seen in phantom lines at 76. The stem 64 is provided with the same hole arrangement seen in FIGS. 2 and 5 which includes the rivet hole 41, nail or screw hole 42 and thread impression 43, as well as the dimples 44 and 45 symmetrical with the rivet hole 41. The saddle 62 also includes the hole 53 in the tip and a hole 52 at the base of the stem to accommodate a tie across the saddle surface 63, which tie may extend completely around the underside of the saddle.

In FIG. 5 there is illustrated the blank shown generally at 78 which may be used to form the saddle of FIGS. 1 or 3. The blanks are formed from a continuous rather narrow strip of metal from a coil running in the longitudinal direction seen in FIG. 5. The blanks are formed prior to the shaping of the saddle between the tip and stem. The parts are then heat treated and then coated or galvanized. The saddle support may typically be made from spring steel, although for special applications stainless steel may be employed.

Figure 6:
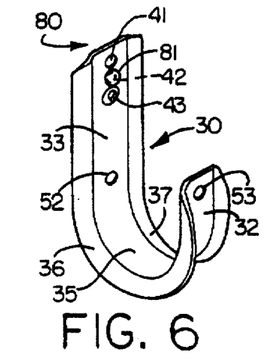
FIG. 6 is a perspective view of the support secured simply to a wall or stud.

Referring now to FIG. 6 there is illustrated a saddle support 30 in accordance with the present invention fastened directly to a wall or stud indicated generally at 80 as the plane of the Figure. The saddle support may be fastened directly to the wall or stud by a screw or nail such as seen at 48 or 49 in FIG. 1 passing directly through the hole 42 provided for that purpose. The head of the screw or nail is seen at 81. The smooth circular surface of the saddle indicated at 35 then projects from the wall or stud at the selected height.

Figure 7:
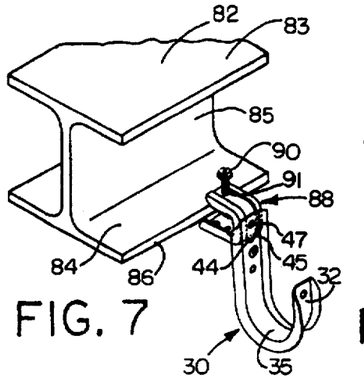
FIG. 7 is a perspective of the support assembled to one form of screw-on beam flange clamp and being secured to a beam flange.

In FIG. 7, the saddle support 30 is being attached to a beam 82 which includes typically a top flange 83, a bottom flange 84, and a web 85 therebetween. The lower flange 84 has an edge 86 which receives a variety of hammer-on or screw-on clamps or clips utilized to support a variety of items. In FIG. 7 there is illustrated one such screw-on clamp at 88 in the process of being installed on the flange edge 86. More specifically, the illustrated clamp 88 may be a big beam clamp sold by Erico, Inc. of Solon, Ohio, U.S.A. under the part number BC400 and under the trademark CADDY®. The trademark CADDY® is a registered trademark of Erico, Inc.

The clamp is generally U-shape in configuration and the cable support saddle 30 is preassembled or attached to the bight portion of the U-shape body by rivet 47. The U-shape body slips over the flange edge 86 and a heavy duty bolt indicated at 90 extending through threaded hole 91 in the upper leg of the clamp is employed to clamp the assembly firmly in place on the lower flange 84 of the beam 83.

The projecting dimples on the stem of the saddle support indicated at 44 and 45 project inwardly just below the bight portion of the clamp body and such dimples interfere with the body to limit or resist twist of the saddle with respect to the clamp about the axis of the rivet 47.

Figure 8:
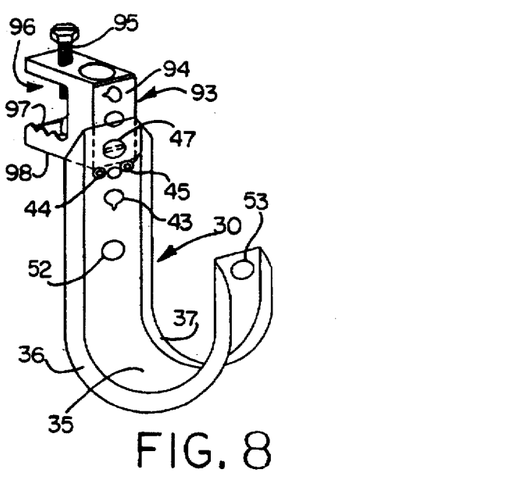
FIG. 8 is an enlarged perspective view of the support attached to another form screw-on flange clamp.
Figure 9:
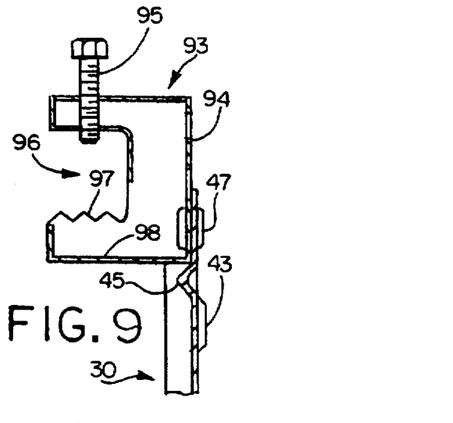
FIG. 9 is a fragmentary vertical section illustrating how the anti-twist dimples interfit with the clamp.

This anti-twist feature is more clearly illustrated in FIGS. 8 and 9 where the saddle support 30 is attached to another type of screw-on beam hanger illustrated generally at 93. The beam hanger 93 is sold by Erico, Inc. of Solon, Ohio, U.S.A. under the part number BC and also under the registered trademark CADDY®. The clamp 93 fits beam flanges to 1.27 cm or a half inch. The beam clamp has a sheet metal body 94 formed in the U-shape configuration illustrated with a bolt 95 threaded above and projecting into the opening or mouth 96, the lower edge or jaw of which is formed by the teeth 97. As illustrated, the saddle is secured to the exterior of the clamp by rivet 47. When thus secured, the dimples illustrated in FIGS. 8 and 9 fit closely beneath the bottom wall 98 at the outer corner and resist any pivoting or twisting movement of the saddle support 30 with respect to the clamp 93 about the axis of the rivet 47.

Figure 10:
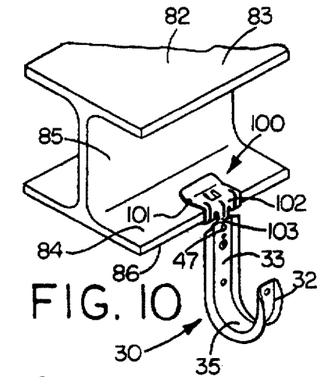
FIG. 10 is a perspective similar to FIG. 7 showing the support assembled to a hammer-on beam flange clip and secured to a beam flange.

Referring now to FIG. 10 the support saddle 30 is secured to the edge 86 of the bottom flange 84 of the beam 82 by a hammer-on flange clip shown generally at 100. Again the flange clip is generally U-shape and is spring steel having flexible top and bottom legs which spread as the clip is hammered on the flange. The edges of the top and bottom legs are provided with barbs indicated at 101 which bite into the flange to resist removal. The clip may be hammered onto the flange edge simply by using a hammer to strike the bight portion of the clip indicated at 102. The bight portion of the clip includes a downwardly extending tab 103 provided with a hole which accommodates the rivet 47. Again the dimples may fit beneath the lower edge of the tab resisting relative rotation between the hammer-on clip and the saddle support. The hammer-on flange clip may be of the type sold by Erico, Inc. of Solon, Ohio, U.S.A. under the registered trademark CADDY® with a catalogue part number of 4H58. Such hammer-on flange clips are available in a number of sizes and fit the edges of most Tees, angles, or flanges. For example, open joists typically have angles along the lower edge with projecting flanges and in combination with a hammer-on clip, the saddle support can be positioned substantially anywhere along such structures.

Figure 11:
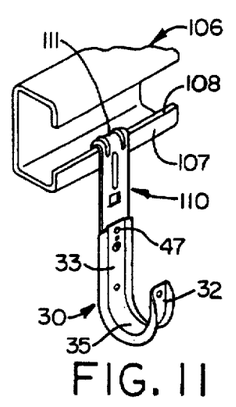
FIG. 11 is a similar view of the support secured to a clip in turn suspended from a C-purlin vertical flange.

Referring now to FIG. 11, there is illustrated a C-purlin shown generally at 106. The name of the structure derives from its sectional shape and the bottom leg of the C includes an upturned flange 107 having an edge 108. The saddle support 30 is rivetted to the lower end of C-purlin clip 110 as indicated at 47. The upper end of the C-purlin clip 110 includes a hook 111 with barbed edges which fits over the edge 108 and such barbed edges resist dislocation. Such C-purlin clips are sold by Erico, Inc., of Solon, Ohio, U.S.A. under the registered trademark CADDY® and under the catalogue number VF. Such clips vary in size. Again the dimples in the saddle support symmetrically located about a vertical axis with respect to the rivet 47 may engage the lower edge of the C-purlin clip and resist twisting or pivoting about the axis of the rivet.

Figure 12:
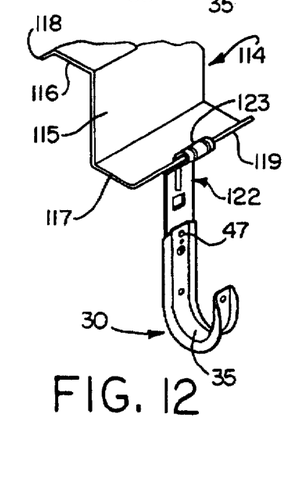
FIG. 12 is a similar view of the support secured to a clip in turn suspended from a Z-purlin.

FIG. 12 illustrates a Z-purlin 114 which has a vertical web 115, and opposite horizontal flanges 116 and 117, each of which terminate in angled flanges 118 and 119. The cable support saddle 30 is riveted at 47 to the lower end of Z-purlin clip 122 which has a top hook 123 which snaps over the edge of flange 119. The hook includes barbs adapted to bite into the Z-purlin flange to resist withdrawal. Again the dimples on the saddle support engage the lower edge of the Z-purlin clip to resist pivoting or twisting about the axis of the rivet. Such Z-purlin clips are sold by Erico, Inc. of Solon, Ohio, U.S.A. under the registered trademark CADDY® and the part number AF. Again the Z-purlin clips come in a variety of sizes.

Figure 13:
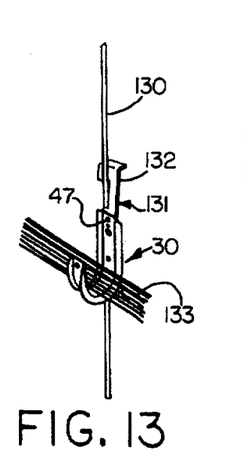
FIG. 13 is a fragmentary view of the support secured to a clip in turn secured to drop wire, which can be a vertical hanging rod or a vertical or horizontal flange.

Drop wires or rods are often used to support various items or utilities from structural components or ceilings. In FIG. 13 a drop wire or rod is illustrated at 130 and the saddle support 30 is connected by rivet 47 to clip 131 in turn clipped to the drop wire. The rivet is secured to the approximate middle of the clip and the clip includes upper and lower spring legs although only the upper leg 132 is visible. The spring legs are bent toward each other to create a lateral notch opening for receipt of the drop wire and when the legs are released on the wire or rod, sharp notch edges bite into and grip the drop wire. Such clips 131 are typical of the multi-function clips for securing various items to drop wires, rods or flanges and are sold by Erico, Inc. of Solon, Ohio. U.S.A. under the trademark CADDY® and also under the catalogue numbers 4Z34 and 6Z34 for example. Such clips may readily be secured to number 12 wire. ¼ inch plain rod, or ⅜ inch plain or threaded rod. Similar clips are shown in prior Havener U.S. Pat. No. 3,055,686. With the assembly of the saddle support 30 and the clip 131, the saddle support and thus the bundle 133 may be positioned vertically anywhere along the drop wire or rod 130.

Figure 14:
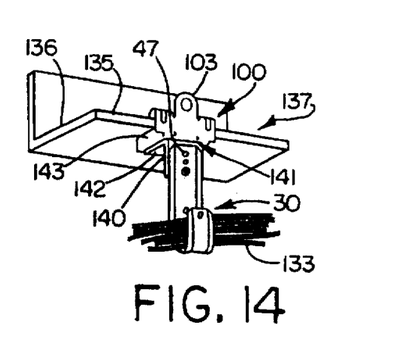
FIG. 14 is a view showing the support secured to a hammer-on bottom mount flange clip with an intermediate angle bracket.
Figure 15:
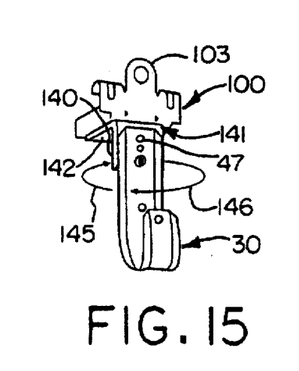
FIG. 15 is a view of the assembly of FIG. 14 illustrating how the angle bracket and support swivels 360° with respect to the flange clip.

Referring now to FIG. 14 there is illustrated a saddle support 30 mounted on the edge 135 of the lower flange 136 of angle 137. The saddle support may be mounted on the angle utilizing the same or a similar hammer-on clip 100 seen in FIG. 10, but turned upside down. Accordingly the tab 103 now projects upwardly. The saddle support is secured to the face of the vertical leg 140 of angle 141 by the rivet 47. The horizontal 142 of the angle is pivoted to the leg 143 of the clip 100 by a suitable pivot fastener such as a rivet. Accordingly, the saddle support may be fastened on the edge 135 simply by hammering the clip onto the edge. However, as seen more clearly in FIG. 15 the saddle support may swivel or pivot 360° about the vertical pivot axis between the horizontal leg of the angle and the clip 100. This pivot or swinging movement is illustrated by the arrows 145 and 146. The intermediate angle 141 may be used to secure the saddle support to the underside of a wide variety of other clips or fasteners such as those seen in FIGS. 7-9.

Figure 16:
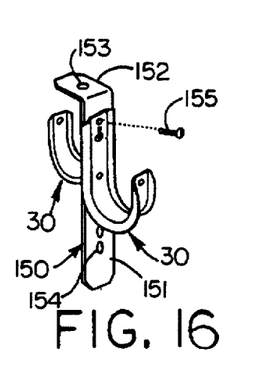
FIG. 16 is an exploded illustration showing how a multiplicity of supports may be structured to an angle bracket.
Figure 18:
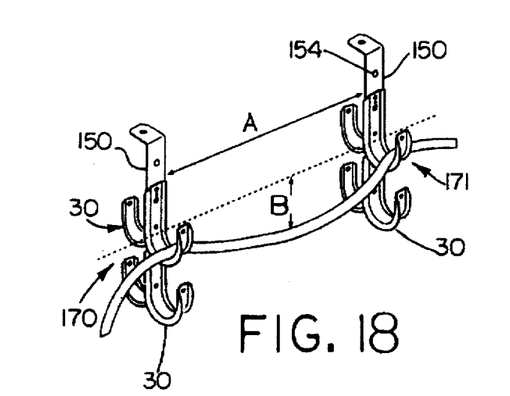
FIG. 18 illustrates the assemblies which can be made with the bracket and the spacing of the supports to limit cable sag.
Figure 19:
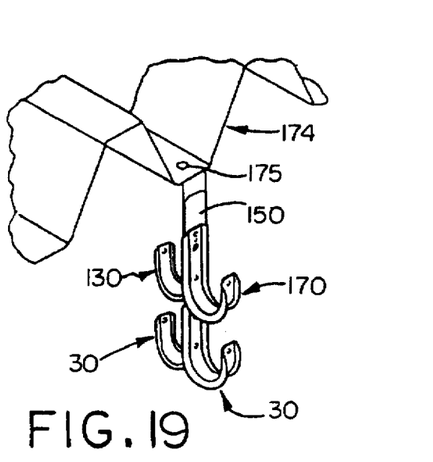
FIG. 19 is a view showing an assembly of supports secured to the underside of a deck.

Referring now to FIG. 16 it will be seen that the saddle support 30 may be utilized in connection with angle bracket 150 which includes a relatively long vertical leg 151 and a relatively short tab or right angle leg at one end seen at 152. The short leg or tab is provided with a mounting hole 153 while the long leg is provided with a number of mounting holes 154. As illustrated in FIG. 16 two saddle supports may be secured back-to-back on opposite sides of the longer vertical portion 151 of the bracket with a single threaded fastener 155. The threaded fastener may extend through the top or rivet hole 41 in the saddle support on the right hand side, through a hole in the bracket, and into the thread form hole 43 in the saddle support on the left hand side as viewed. For this reason the saddle supports are slightly vertically offset from each other. As illustrated in FIGS. 18 and 19, up to four such saddle supports may be mounted on the brackets, two on each side of the bracket, and of such two, one above the other.

Figure 17:
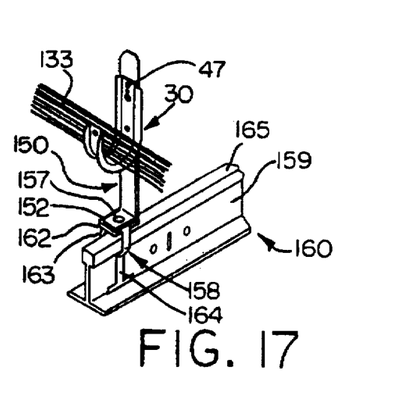
FIG. 17 illustrates how the support secured to the same angle bracket may be in-turn be secured to a clip to snap on top of a drop ceiling Tee bar.

Referring now to FIG. 17 there is illustrated the saddle support 30 mounted on the bracket 150 by rivet 47 but positioned in the opposite direction. The short angle tab 152 is now on the bottom and secured by rivet 157 to a Tee-bar clip 158 mounting the assembly on the stem 159 of a Tee-bar grid element 160. The clip 158 provides a top platform 162 to receive the rivet 157 and spring legs 163 and 164 which extend around the bulb of the stem of the Tee indicated at 165 and clasp the stem of the Tee and thus securing the saddle support to the top of the Tee-bar in the position illustrated supporting the bundle 133 well above the Tee-bar grid. The fastener 158 is of the type widely used with Tee bar and sold by Erico, Inc. of Solon, Ohio, U.S.A. under the trademark CADDY® and under the catalogue part number 528.

It is noted that the factory installed rivet 157 may fix the angle between the bracket and clip so that the bundle extends in any desired direction with respect to the Tee bar. Alternatively, the rivet may be installed to form a pivot so that the direction is field adjustable.

FIG. 18 illustrates 2 four saddle support assemblies shown at 170 and 171 formed on the brackets 150. The brackets in turn may be secured to clamps, clips, or pivot angles, as illustrated in the other embodiments, or may be secured directly to a structure. In any event, the two assemblies are spaced a distance A to limit the sag of the cable between supports to no more than a distance B.

In practice, and to meet conforming standards, the distance A should be no more than from about 120 cm. to about 150 cm. to maintain the distance B to no more than about 30 cm. With the saddle support of the present invention and its versatility of assembly with a wide variety of other clamps or clips, the A dimension may readily be held to the noted span to limit the sag.

Referring now to FIG. 19 there is illustrated an assembly 170 which may be the same as that illustrated in FIG. 18. The assembly comprises four saddle supports 30 mounted on the bracket 150 with the upper tab being secured to trapezoidal deck 174 at 175. The bracket may be fastened by a rivet, a sheet metal screw, a tack or spot weld, or simply tucked into an overlap between two deck panels. It will be appreciated that assemblies such as shown at 170 may be fastened to a wide variety of other structures.

Figure 20:
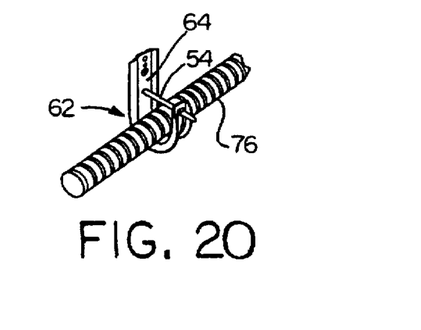
FIG. 20 is an illustration of the support accommodating a plemun guard for a fiber optic cable with a tie in place.

FIG. 20 illustrates a plemun guard 76 mounted in a saddle support 62 with a tie 54 extending thereover. The saddle support may be mounted directly on a stud or wall, for example, or in any other manner. The plemun guard or innerduct fits snugly in the circular portion of the saddle between the two shoulders. The plemun guard or innerduct is not loose nor is its pinched or crushed.

The diameter of the saddle may be sized to fit the plemun guard and may vary in size for that purpose. One size may be about 3.34 cm in diameter, another about 5.1 cm in diameter. The stem to the bottom of the saddle is about two or three times the diameter, and the tip about half the stem.

When a rivet is employed to assemble the saddle support to another clamp or clip, it is preferred that the assemblies be factory formed. However, the built-in thread impression provides for quick field assembly with a standard ¼ inch bolt. The cable and tie closure holes provide contact free containment for sensitive high performance cables, while the rounded edges or corners eliminate any snag potential.

It can now be seen that there is provided a cable support for category 5 cable or plemun guards for fiber optic cable or innerduct which makes such cable easier to install and costs considerably less than cable trays or trapeze systems. The system of the present invention is adaptable to beams, bar joists, decking, concrete, wood, metal stud, strut, acoustical Tee, drop wires and rods, and many other structural shapes. With the present invention the cabling can simply be bundled and laid in without kinking, bending or crimping.

To the accomplishment of the foregoing and related ends, the invention then comprises the features particularly pointed out in the claims, these being indicative, however, of but a few of the various ways in which the principles of the invention may be employed.

I claim:

1. A low voltage communications cable support for supporting a plurality of horizontal runs of such cables with minimal cable sag on each side of the support comprising a semi-circular communications cable receiving saddle having a wide relatively flat center cylindrical surface section, and stiffening flanges at each outer edge of said flat surface section, said stiffening flanges projecting radially outwardly and downwardly around said semi-circular saddle at an obtuse angle to interior of said flat center cylindrical surface section to avoid sharp corners around said cable receiving saddle, and attachment means to secure said support to a structure.

2. A cable support as set forth in claim 1 including a stem extending tangent to one side of the saddle, and wherein saddle has a diameter about half the height of the stem.

3. A cable support as set forth in claim 2 wherein said semicircular saddle has a tip extending upwardly generally parallel to the stem, holes in said tip and the base of said stem adapted to receive a tie to close the saddle without touching the cable.

4. A cable support as set forth in claim 3 including a plurality of holes in said stem horizontally clear of the saddle for accommodating various kinds of fasteners.

5. A cable support as set forth in claim 4 including at least three holes in said stem, one including a thread form.

6. A cable support as set forth in claim 1 wherein said attachment means includes means to swing said support about a vertical axis whereby the axis of the semi-circular saddle may be oriented in substantially any generally horizontal direction.

7. A cable support as set forth in claim 1, including a bracket, and means to secure a plurality of cable supports to said bracket, and means to secure said bracket to a structure.

8. A cable support as set forth in claim 7 including a stem on each saddle support to facilitate the mounting of said saddles on said bracket.

9. A cable support as set forth in claim 8 wherein said stem includes a pair of anti-twist dimples.

10. A cable support as set forth in claim 9 including a stiffening groove in the center of the saddle.

11. A cable support as set forth in claim 10 wherein the semi-circular saddle includes down turned flanges with a radius at each corner.

12. A cable support as set forth in claim 11 wherein said flanges extend downwardly and outwardly at about 45°.

13. A low voltage communications cable support comprising a saddle having a smooth curved saddle surface to support a run of a bundle of such cables, a vertically projecting stem on one side of the saddle, attachment means to secure said stem and thus said support to a building structure, and an upwardly projecting bundle confining tip on the opposite side of the saddle, and means to extend a tie from said tip to the stem across the top of the saddle to confine the bundle of cables within the saddle without contact between the tie and the bundle.

14. A cable support as set forth in claim 13 wherein said projecting stem extends substantially above said upwardly projecting bundle confining tip, and a plurality of attachment holes in said stem clear of said tip.

15. A cable support as set forth in claim 14 including a hole in said upwardly projecting bundle confining tip and an aligned hole in said stem through which said tie may be secured substantially horizontally above said saddle and the supported bundle.

16. A cable support as set forth in claim 15 including a plastic tie secured to said support extending across the saddle.

17. A method of supporting a run of a bundle of low voltage communication cable, comprising the steps of providing spaced supports, each comprised of a curved saddle having smooth down-turned obtuse angle lateral edges, suspending the run from saddle to saddle, and spacing the saddles along the run so that the run sags between saddles no more than about 30 cm below the saddles.

18. A method as set forth in claim 17 including the step of providing a vertical swing axis between the saddle and structure enabling the saddle to be oriented in any horizontal direction.

19. A method as set forth in claim 17 including the step of providing a plain hole and a thread form hole in each saddle support whereby two saddle supports may be secured with a single threaded fastener passing through a plain hole in one saddle support, and the thread form hole in the other saddle support to clamp both saddle supports when the fastener is tightened.

20. A method as set forth in claim 17 wherein said spacing of said saddles is from about 120 cm to about 150 cm.

21. A method as set forth in claim 17 wherein said saddle includes a circular surface extending for about 180° to receive in a snug fit a correspondingly sized plemun guard for fiber optic cable or innerduct.

22. A method as set forth in claim 21 including the step of supporting up to fifteen cables of twenty-five twisted pair, or eighty cables of four twisted pair, within the saddle.

23. A method as set forth in claim 22 including the step of enclosing the bundle with a tie without touching the bundle with the tie.

24. A method as set forth in claim 17 including the step of closing the saddle with a plastic tie not touching the bundle.

25. A method as set forth in claim 17 including the step of enclosing the bundle with a tie without touching the bundle with the tie.

26. A method as set forth in claim 25 including the step of extending the tie over the top of the saddle and around the bottom of the saddle.

27. In combination a building structure supporting a generally vertical drop wire or rod, a low voltage communications cable support for supporting a plurality of horizontal runs of such cables with minimal cable sag on each side of the support comprising a semi-circular saddle having an axis with a wide flat center section and downwardly and outwardly angled outer edge flanges with a vertically extending stem, and intermediate clip means secured to said stem of said cable support and operative to grip said drop wire or rod at any position therealong and with the axis of the saddle extending in any generally horizontal direction with respect to said drop wire or rod.

28. The combination set forth in claim 27 wherein said clip means is a spring clip having notched legs adapted to be clipped to the drop wire or rod.

29. The combination set forth in claim 28 wherein said vertically extending stem includes a plurality of fastener holes vertically clear of the semi-circular saddle, and a fastener in a selected one of said holes securing said support to said spring clip.

30. The combination set forth in claim 29 wherein said fastener is a rivet.

31. In combination, a building structure having a projecting edge, a low voltage communications cable support for supporting a plurality of horizontal runs of such cables with minimal cable sag on each side of the support comprising a semi-circular saddle having an axis with a wide flat center section and downwardly and outwardly angled outer edge flanges with a vertically extending stem, and intermediate fastener means secured to said stem of said cable support and gripping said projecting edge of said building structure to support said cable support from said building structure in a selected position.

32. The combination set forth in claim 31 wherein the top of the vertically extending stem extends above the semi-circular saddle about twice the diameter thereof.

33. The combination set forth in claim 31 wherein said semi-circular saddle is a cylindrical section, and stiffening flanges extending radially of said section outwardly and downwardly at an obtuse angle to the interior of said center cylindrical surface section.

34. The combination set forth in claim 31 wherein said combination includes swing means to position the axis of the saddle at any angle with respect to said projecting edge of said building structure.

35. The combination set forth in claim 34 wherein said swing means extends between said intermediate fastener and said support enabling relative pivoting of said support with respect to the intermediate fastener about a generally vertical axis.

36. The combination set forth in claim 35 wherein said intermediate fastener means is a spring clip gripping the edge.

37. The combination set forth in claim 35 wherein said intermediate fastener means is a screw clamp gripping the edge.

38. The combination set forth in claim 31 wherein said support includes a plurality of vertically aligned and spaced generally circular fastener holes for securing said support, said semi-circular saddle including a projecting tip portion opposite the stem, the plurality of generally circular holes being horizontally clear of the saddle and its projecting tip portion.

39. A low voltage communication cable support for supporting a plurality of runs of such cables with minimal cable sag on each side of the support comprising a semi-circular saddle with a cylindrical section and outer edge flanges extending radially outwardly and downwardly, a vertically extending stem section tangent to the saddle, and a plurality of generally circular holes in said vertically extending section, one of which has a thread form and another of which is plain whereby an assembly of supports may be formed by passing a headed fastener through the plain hole of one and threading it into the thread form hole of another.

40. A cable support as set forth in claim 39 wherein said plurality of holes are vertically aligned yet offset whereby in the assembly said one cable support will be at a different elevation than said another cable support.

41. A cable support as set forth in claim 40 wherein said thread form hole is below said plain hole.

42. A cable support as set forth in claim 40 said semi-circular saddle includes a projecting tip opposite the vertically extending section, said holes being horizontally clear of the saddle and its projecting tip.

43. A cable support as set forth in claim 39 wherein said outer edge flanges extend at an obtuse angle to the cylindrical section.

44. A cable support as set forth in claim 43 including a radius between each flange and the center cylindrical section.

45. A cable support as set forth in claim 44 wherein said flanges and radii extend beyond the saddle to the stem section interior of the support.

* * * * *

US005740994C1

(12) EX PARTE REEXAMINATION CERTIFICATE (4850th)
United States Patent
Laughlin (10) Number: US 5,740,994 C1
(45) Certificate Issued: Sep. 23, 2003

(54) CABLE SUPPORT AND METHOD (75) Inventor: Raymond Scott Laughlin, Cuyahoga Falls, OH (US)

(73) Assignee: Erico International Corporation, Solon, OH (US)

Reexamination Request:
No. 90/005,606, Jan. 5, 2000

Reexamination Certificate for:
Patent No.: 5,740,994
Issued: Apr. 21, 1998
Appl. No.: 08/773,981
Filed: Dec. 26, 1996

(51) Int. Cl.[7] ................................. F16L 3/22
(52) U.S. Cl. ............................ 248/68.1; 248/58
(58) Field of Search .................... 248/74.1, 73, 68.1, 248/58, 59, 62, 65, 903

(56) References Cited

U.S. PATENT DOCUMENTS

| | | | | |
|---|---|---|---|---|
| 3,130,948 A | * | 4/1964 | Bedford, Jr. | 248/58 |
| 3,218,012 A | * | 11/1965 | Volpe | 248/62 |
| 4,039,131 A | | 8/1977 | Perrault et al. | |
| 4,709,888 A | | 12/1987 | Cubit et al. | |
| 5,193,769 A | * | 3/1993 | Hofle | 248/59 |
| 5,385,320 A | * | 1/1995 | Ismert et al. | 248/62 |

FOREIGN PATENT DOCUMENTS

| | | | |
|---|---|---|---|
| GB | 1577726 | * | 10/1980 |
| JP | 64-18691 | * | 1/1989 |
| JP | 3-89290 | * | 9/1991 |

OTHER PUBLICATIONS

ERICO Caddy Fasteners 1992.*
ERICO Caddy Fasteners for Communications & Low Voltage Application.*
B–LINE Spring Steel Fasteners 1995.*
OBO Betterman KTS'94.*

* cited by examiner

Primary Examiner—Ramon O. Ramirez (57) ABSTRACT

A cable support for category 5 cable, fiber optic cable, and the like is in the form of a curved smooth saddle to support the cable in lay-in fashion. The saddle has a projecting stem with a number of fastening accommodations to receive all kinds of clamps, clips or brackets, so that one or more supports may be positioned on or suspended from anything or any surface in the utilitarian part of a building such as the area above a drop ceiling. This enables the supports to be positioned within about 120–150 cm of each other so that cable sag between support saddles does not exceed 30 cm.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5, 9–26 and 39–45 is confirmed.

Claims 1–4, 6–8 and 27–38 are cancelled.

New claims 46 and 47 are added and determined to be patentable.

*46. The cable support as set forth in claim 1 wherein the stem has at least one fastener hole therein, and the stem has at least one tie hole therein adapted to receive a tie to close the saddle without touching the cable.*

*47. The cable support as set forth in claim 46 wherein the tip has means for receiving a tie to close the saddle without touching the cable.*

* * * * *

(12) EX PARTE REEXAMINATION CERTIFICATE (6630th)
United States Patent
Laughlin (10) Number: US 5,740,994 C2
(45) Certificate Issued: Jan. 20, 2009

(54) CABLE SUPPORT AND METHOD (75) Inventor: Raymond Scott Laughlin, Cuyahoga Falls, OH (US)

(73) Assignee: Erico International Corporation, Solon, OH (US)

Reexamination Request:
No. 90/007,891, Jan. 23, 2006

Reexamination Certificate for:
| | |
|---|---|
| Patent No.: | 5,740,994 |
| Issued: | Apr. 21, 1998 |
| Appl. No.: | 08/773,981 |
| Filed: | Dec. 26, 1996 |

Reexamination Certificate C1 5,740,994 issued Sep. 23, 2003

(51) Int. Cl.
*F16L 3/24* (2006.01)
*F16L 3/22* (2006.01)
*F16L 3/23* (2006.01)

(52) U.S. Cl. ......................................... 248/68.1; 248/58
(58) Field of Classification Search ............... None
See application file for complete search history.

(56) References Cited

U.S. PATENT DOCUMENTS

| 3,130,948 A | * | 4/1964 | Bedford, Jr. | 248/58 |
| 3,218,012 A | * | 11/1965 | Volpe | 248/62 |
| 4,039,131 A | * | 8/1977 | Perrault et al. | 248/73 |
| 4,709,888 A | * | 12/1987 | Cubit et al. | 248/73 |
| 5,193,769 A | * | 3/1993 | Hofle | 248/59 |
| 5,385,320 A | * | 1/1995 | Ismert et al. | 248/62 |

FOREIGN PATENT DOCUMENTS

GB 1577726 A * 10/1980
JP 64-18691 U * 1/1989
JP 3-89290 U * 9/1991

OTHER PUBLICATIONS

EIA/TIA Standard No. ANSI/EIA/TIA–569–1990, "Commercial Building Standard for Telecommunications Pathways and Spaces", published by Electronic Industries Association, Washington, DC, Oct. 1990.*
OBO Bettermann brochure, "OBO Kabeltrag–Systeme KTS'94", dated 1994, 4 pages.*
Erico Fastening Products catalog, "Caddy Fasteners for Communications & Low Voltage Applications", Erico, Inc., dated 1994, pp. 1–22.*
Erico Fastening Products catalog, "Caddy Fasteners", Erico, Inc., dated 1992, pp. 1–64.*
B–Line Fasteners catalog, "Spring Steel Fasteners: Product and Application Guide", B–Line Systems, Inc., dated 1995, pp. 1–127.*
Definition of the word "tie" from Webster's Third New International® Dictionary, Unabridged, Copyright © 1993, Merriam–Webster, Incorporated.*
Transcript of Proceedings held on Mar. 9, 2006, *Erico International Corporation v. Doc's Marketing Corporation*, US District Court for the Northern District of Ohio, Eastern Division, Case No. 1:05cv2924, pp. 1 and 77–99.*

* cited by examiner

*Primary Examiner*—Peter C. English (57) ABSTRACT

A cable support for category 5 cable, fiber optic cable, and the like is in the form of a curved smooth saddle to support the cable in lay-in fashion. The saddle has a projecting stem with a number of fastening accommodations to receive all kinds of clamps, clips or brackets, so that one or more supports may be positioned on or suspended from anything or any surface in the utilitarian part of a building such as the area above a drop ceiling. This enables the supports to be positioned within about 120–150 cm of each other so that cable sag between support saddles does not exceed 30 cm.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 38–49:

In addition, the base of the stem is provided with a hole 52 while the tip is provided with a hole 53. These holes are generally opposite each other, and such holes may accommodate a plastic tie indicated at 54. *The tie may be a nonrigid tie.* The tie extends over the top of the saddle and may also extend around the bottom of the saddle as indicated at 55 in FIG. 2. The tie 54 may then extend over the top of the bundle 57 seen in FIG. 2 which has been laid-in the saddle. Alternatively, the tie may extend complete around the bundle beneath the bottom of the saddle. In either event, the optional tie closing the saddle does not touch the bundle, after the bundle is simply laid-in the supporting saddle.

AS A RESULT OF REEXAMINATION, IT HAS BEEN DETERMINED THAT:

The patentability of claims 5, 9–12, 19 and 39–45 is confirmed.

Claims 1–4, 6–8 and 27–38 were previously cancelled.

Claims 17, 18, 20–22, 46 and 47 are cancelled.

Claims 13, 15 and 23–26 are determined to be patentable as amended.

Claims 14 and 16, dependent on an amended claim, are determined to be patentable.

New claim 48 is added and determined to be patentable.

13. A low voltage communications cable support comprising a saddle having a smooth curved saddle surface to support a run of a bundle of such cables, a vertically projecting stem on one side of the saddle, attachment means to secure said stem and thus said support to a building structure, and an upwardly projecting bundle confining tip on the opposite side of the saddle, and means to extend a *nonrigid* tie from said tip to the stem across the top of the saddle [to confine], *said nonrigid tie secured to the saddle and confining* the bundle of cables within the saddle without contact between the tie and the bundle.

15. A cable support as set forth in claim 14 including a hole in said upwardly projecting bundle confining tip and an aligned hole in said stem through which said *nonrigid* tie may be secured substantially horizontally above said saddle and the supported bundle.

23. A method as set forth in claim 22 including the step of enclosing the bundle with a *nonrigid* tie without touching the bundle with the tie.

24. A method as set forth in claim 17 including the step of closing the saddle with a *nonrigid* plastic tie not touching the bundle.

25. A method as set forth in claim 17 including the step of enclosing the bundle with a *nonrigid* tie without touching the bundle with the tie.

26. A method as set forth in claim 25 including the step of extending the *nonrigid* tie over the top of the saddle and around the bottom of the saddle.

*48. The method of claim 17 including the step of securing the run within at least one of the saddles with a nonrigid tie, wherein the securing includes confining the run within the saddle without contact between the nonrigid tie and the run.*

* * * * *